United States Patent [19]

Fukayama

[11] 3,814,300

[45] June 4, 1974

[54] CAPSTAN DRIVE ASSEMBLY FOR A CARTRIDGE TAPE PLAYER

[75] Inventor: Gary P. Fukayama, Roselle, Ill.

[73] Assignee: Motorola, Inc., Chicago, Ill.

[22] Filed: June 21, 1973

[21] Appl. No.: 372,383

[52] U.S. Cl. .............................................. 226/194
[51] Int. Cl. ........................................... B65h 17/20
[58] Field of Search ............ 226/181, 190, 194, 188

[56] References Cited

UNITED STATES PATENTS 3,122,294 2/1964 Laa .............................. 226/190 X
3,602,415 8/1971 Gross ................................ 226/194

*Primary Examiner*—Allen N. Knowles
*Attorney, Agent, or Firm*—Vincent J. Rauner; Ronald J. LaPorte

[57] ABSTRACT

A capstan drive assembly for a cartridge type tape player includes a hollow capstan shaft member attached at one end to a flywheel for rotation therewith. The capstan shaft member receives, through the opposite end thereof, a support shaft extending upwardly from a base member fixedly mounted on the base wall of the cartridge tape player deck. A bearing surface member within the hollow capstan shaft engages the support shaft to minimize friction. The hollow shaft and flywheel are driven rotatably on the support shaft by a drive motor coupled to the flywheel by a drive belt or the like. In one embodiment, the free end of the hollow capstan shaft engages a thrust washer or bearing surface on the base member for rotation thereon. In another embodiment, a bearing ball is placed in a recess at the free end of the support shaft and the capstan and flywheel are supported thereon.

8 Claims, 3 Drawing Figures

CAPSTAN DRIVE ASSEMBLY FOR A CARTRIDGE TAPE PLAYER

BACKGROUND

This invention relates generally to cartridge type tape players and more particularly to the capstan tape drive assembly thereof.

Conventionally, capstan tape drive assemblies which are used in cartridge type tape players include a solid capstan shaft which is mounted at one end to the central point of a flywheel. The capstan shaft and flywheel are supported in a bearing bracket mounted on or formed with the base plate of the tape deck. The opposite end of the capstan shaft normally includes a bearing surface which rides on the base plate. The flywheel is coupled by a belt to a drive motor for rotation. The capstan shaft is thereby rotated on the bearing end while being held near opposite ends thereof in the bearing bracket. The last-mentioned bracket includes bearing members which are spaced from each other to support the capstan shaft near both ends and to allow the movement of a tape cartridge therebetween so as to permit contact of a pressure roller in the cartridge with the capstan shaft for driving the tape therebetween.

While the above described capstan assemblies work well in cartridge tape players, they are not well suited for use in small, low profile tape cartridge players. The bearing bracket requires considerable space in the player housing and must be of a sufficient height to provide proper alignment and support to the capstan shaft, thereby making the overall height of the capstan assembly greater than is desired in the low profile tape players.

SUMMARY

Accordingly, it is a primary object of the present invention to provide a new and improved capstan assembly for a cartridge tape player which lends itself for use in low profile tape players.

It is another object of the present invention to provide a capstan assembly of the above described type which requires no separate bearing bracket for supporting the capstan shaft.

It is still another object of the present invention to provide a capstan assembly which is efficient in operation, relatively simple in construction and low in cost.

Briefly, the capstan drive assembly according to the invention includes a hollow capstan shaft member attached at one end to a flywheel for rotation therewith. The capstan shaft member receives, through the opposite end thereof, a support shaft extending upwardly from a base member on which the support shaft is fixedly mounted. The base member is in turn mounted on the base wall of the cartridge tape player deck portion. A bearing surface member within the hollow capstan shaft engages the support shaft to minimize friction. The flywheel and hollow capstan shaft are driven rotatably on the support shaft by means of a drive motor coupled to the flywheel by a drive belt or the like.

In one embodiment, the end of the capstan shaft into which the support shaft is inserted engages a thrust or bearing surface on the base member. The flywheel and capstan shaft are supported directly by the last-mentioned bearing surface. The free end of the support shaft extends through the flywheel and is coupled thereto by a C-washer so as to permit relative rotation therebetween but at the same time to prevent easy removal of the flywheel and capstan from the support shaft.

In another embodiment, a bearing ball is placed in a recess at the free end of the support shaft and the capstan and flywheel are supported thereon. Gravity and the attachment of the flywheel to the drive motor by means of the drive belt, maintain the flywheel and capstan shaft on the support shaft in this case.

DETAILED DESCRIPTION

Figure 1:
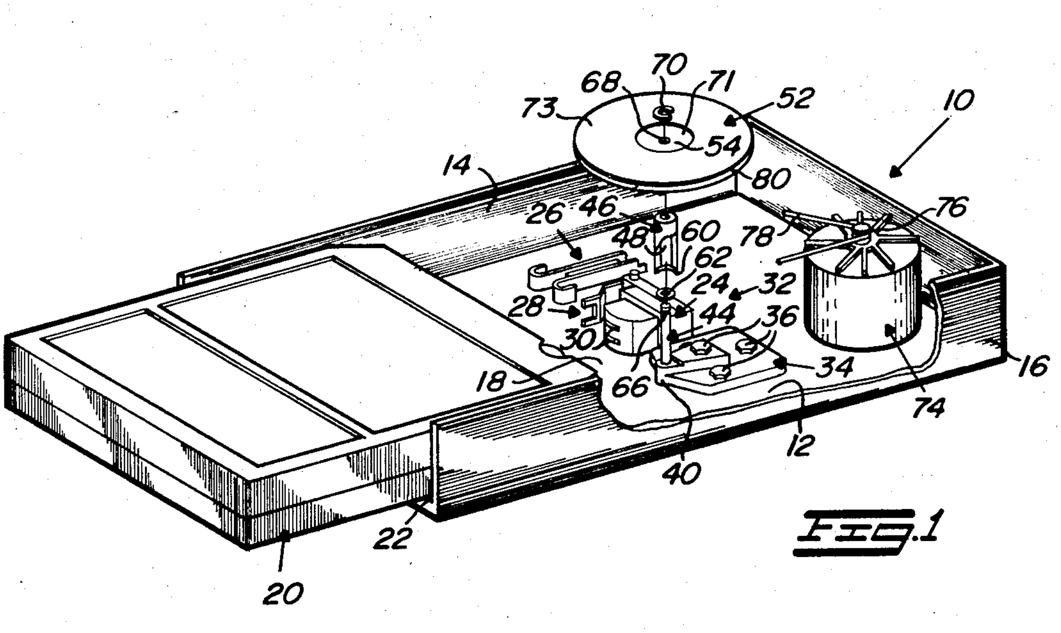
FIG. 1 is a perspective view of a cartridge type tape player including a preferred embodiment of a capstan tape drive assembly according to the invention.

Referring now to the drawing in greater detail wherein like numerals have been used throughout the various views to designate similar components, there is illustrated in FIG. 1 the deck portion 10 of a cartridge tape player. The deck portion 10 includes a base wall 12 and a pair of side walls 14, 16 extending upwardly therefrom at opposite sides to form a tunnel or cavity 18 into which tape cartridges, such as 20, of the conventional type, are inserted from one end 22. At the opposite end of the cavity or tunnel 18 there is provided tape driving and playing components, such as, for example, a magnetic tape head 24 mounted on base wall 12 for playing back information recorded on a magnetic tape provided in cartridge 20. An end of tape sensor 26 which detects the end of the tape tracks and actuates apparatus (not shown) for adjusting the height of the tape head with respect to the tape, is also mounted on base wall 12 of the deck portion adjacent the tape head. In addition, a tape guide member 28 is provided next to tape head 24 for guiding the tape past the pick-ups 30 of the tape head in correct alignment.

On the opposite side of the tape head 24, there is provided a capstan tape drive assembly 32 according to the invention. The capstan drive assembly serves to drive the magnetic tape through the cartridge 20 past the tape head, etc., during playback.

Figure 2:
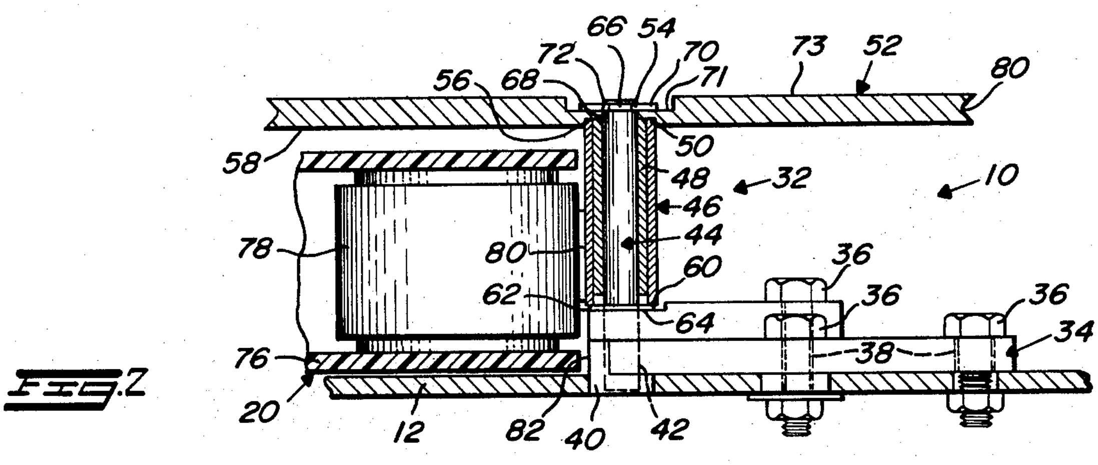
FIG. 2 is an enlarged side sectional view of the capstan assembly of FIG. 1 according to the invention.

The capstan assembly 32 of FIG. 1 can best be seen in FIG. 2 of the drawing and includes a base member 34 mounted, by suitable fasteners, such as, nut and bolt arrangements 36 extending through apertures such as 38 in the base member, to wall 12 of the deck portion 10. At one end 40 of the base member, there is provided an aperture 42 extending thereinto. Received in the aperture is a support shaft or pin 44. The last-mentioned shaft is secured in aperture 42 by staking or another suitable technique to prevent movement of the shaft with respect to the base member 34. The support shaft 44 extends upwardly from the base member a predetermined distance.

A hollow capstan shaft 46 having a circular cross section is provided for mounting on support shaft 44 and for rotation with respect thereto. A bearing surface 48 is included within the hollow shaft 46 for engagement with the outer surface of the support shaft to permit smooth rotation of the hollow shaft. The bearing surface is shown herein as an inserted, separate cylindrical or tubular member located within hollow shaft 46, but can be integrally formed with the hollow shaft if desired. The inner diameter of the bearing member is slightly larger than the outer diameter of shaft 44 to allow rotation of the capstan shaft with respect to the support shaft with minimum wobble.

One end 50 of the capstan shaft 46 is attached to a flywheel 52 at the center point 54 thereof for rotation therewith. Herein, the attachment is accomplished by staking the end 50 of the capstan shaft into an appropriate recess 56 provided in one surface 58 of the flywheel. The hollow capstan shaft and flywheel when joined, are mounted on the support shaft 44 for rotation thereabout.

The opposite end 60 of the capstan shaft rests on a thrust washer or bearing surface 62 provided on the upper wall 64 of the base member 34 surrounding the support shaft 44. The end 60 of the capstan shaft rotates on the thrust washer or bearing surface 62.

To ensure that the joined flywheel and capstan shaft remain in position on the support shaft 44, the free end 66 of the last-mentioned shaft extends through an appropriately dimensioned aperture 68 in the flywheel and a C-washer 70 is received in a groove 72 provided in the end of the support shaft. A recess 71 in surface 73 of the flywheel permits the receipt of C-washer 70 on the end of the support shaft without requiring the support shaft to extend beyond surface 73 of the flywheel. The flywheel and capstan shaft are freely rotatable with respect to the support shaft, but are coupled thereto by means of the C-washer.

The flywheel is driven rotatably by the usual drive motor such as 74. The output shaft 76 of the motor is attached by a drive belt 78 to the outer rim 80 of the flywheel which, as can be seen in FIG. 2, is grooved to receive the belt. It should be noted that the motor is positioned adjacent the end of the base member opposite the end in which support shaft 44 in positioned. The components are so positioned to provide the greatest support of the support shaft against the force of the drive belt 78 applied to the flywheel.

When a cartridge, such as 20, is inserted into cavity 18 of the player deck portion 10, the lower wall 76 of the cartridge rests on base wall 12 thereof. A pressure roller 78 mounted for rotation in the cartridge, and over which a magnetic tape, such as 80, passes, is brought toward the capstan shaft for contacting engagement therewith. In the embodiment shown, the pressure roller extends below the capstan shaft near base wall 12. The outer surface of the capstan shaft, however, extends beyond the end surface 82 of the base member so that there is no chance that the last-mentioned member will interfere with the rotation of the pressure roller and the driving of tape 80 during operation. The tape 80 is sandwiched between the capstan shaft 46 and the pressure roller (FIG. 2) and is thereby driven through the cartridge in a conventional manner.

Figure 3:
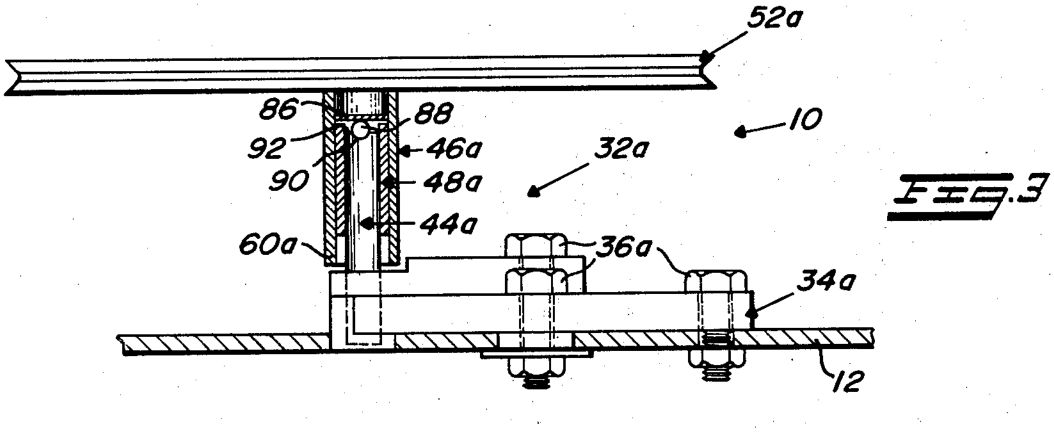
FIG. 3 is an enlarged side sectional view of an alternative embodiment of a capstan assembly according to the invention.

A second embodiment 32*a* of the capstan drive shaft assembly according to the invention is shown in FIG. 3 of the drawing. In the case of the embodiment 32*a*, the base member 34*a* is similar to the base member 34 of the embodiment shown in FIGS. 1 and 2 and is likewise attached to the base wall 12 of the tape player deck portion 10 in a similar manner; i.e., by nut and bolt arrangements 36*a*.

The support shaft 44*a* is mounted on the base member in a similar fashion also, and extends upwardly from the base member as well, but is not as great in length as shaft 44.

The capstan shaft 46*a* is similar to shaft 46 of FIGS. 1 and 2, also being hollow and attached to the flywheel 52*a* at the center thereof and including a bearing surface 48*a* internally thereof for minimizing the friction between the support shaft 44*a* and the hollow capstan shaft. The last-mentioned shaft is mounted on the support shaft for rotation with respect thereto. In the case of the capstan shaft 46*a*, however, an internally located end bearing surface 86 is provided and a bearing ball 88 is also provided for engagement therewith. The bearing ball is located in a recess 90 formed in the end 92 of support shaft 44*a*. The bearing ball engages both the end of shaft 44*a* and the bearing surface 86 of the hollow capstan shaft to support the joined capstan shaft and flywheel rotatably thereon. The end 60*a* of the capstan shaft does not engage the upper surface of the base member as in the case of the embodiment of FIGS. 1 and 2, but is spaced therefrom. Thus, the area of contact between the support shaft 44*a* and the hollow capstan shaft is only at bearing surface 48*a* and the outer surface of the support shaft, and between the bearing ball 88 and the end surface of support shaft 44 and the bearing surface 86.

In the case of the embodiment 32*a* of the capstan assembly, no special means are provided to secure the joined flywheel and capstan shaft on the support shaft. Gravity and the attachment of the flywheel to the drive motor provide the mounting force necessary to maintain the flywheel and capstan shaft on the support shaft.

The embodiment 32*a* of the capstan assembly according to the invention, like embodiment 32 thereof, requires no outer bearing bracket as do conventional capstan assemblies. Thus, the over-all height of the assembly can be made smaller and it is well suited for use in new low profile tape players.

While preferred embodiments of the invention have been shown and described, it should be understood that the invention is not limited thereto since many other modifications may be made. It is therefore contemplated to cover by the present application any and all such modifications as fall within the true spirit and scope of the appended claims.

I claim:

1. A capstan assembly for a cartridge tape player having a housing wall and a flywheel driven rotatably, said capstan assembly including in combination: hollow shaft means having a predetermined inner diameter, mounted at one end to said flywheel for rotation therewith, bearing surface means provided within said hollow shaft means, support shaft means mounted rigidly on said housing wall and being received in said hollow shaft means in engagement with said bearing surface means, said hollow shaft means being rotatable with respect to said support shaft means due to rotation of said flywheel.

2. A capstan assembly as claimed in claim 1 wherein said bearing surface includes a tubular member inserted fixedly within said hollow capstan shaft and having an inner diameter slightly greater than the outer diameter of said support shaft to provide smooth rotation of the capstan shaft with respect to said support shaft with minimum wobble.

3. A capstan assembly as claimed in claim 1 further including support shaft holder means mounted on said housing wall, said holder means including a thrust bearing surface with which said opposite end of said hollow shaft means is in engagement.

4. A capstan assembly as claimed in claim 3 wherein said support shaft extends through said flywheel and wherein said assembly further includes means for attachment to the free end of said support shaft to retain said flywheel and capstan shaft on said support shaft.

5. A capstan assembly as claimed in claim 1 wherein said bearing surface means includes a bearing ball mounted on the end of said support shaft, said bearing ball engaging an internal surface of said capstan shaft, and supporting said capstan shaft and flywheel for rotational movement thereon.

6. In a cartridge type tape player including a housing having a base wall, means defining a cartridge receiving opening having a first open end into which cartridges are inserted, each said cartridge including a pressure roller over which a recording tape passes, a tape head located at the opposite end of said tunnel for engagement with said recording tape, tape drive motor means and a capstan assembly including a capstan shaft mounted for driving engagement with said pressure roller to propel the tape through said cartridge past said tape head, said capstan assembly including in combination: a flywheel, said flywheel being coupled to said drive motor means for driving the former rotatably, hollow capstan shaft means having a predetermined inner diameter attached at a first end thereof to said flywheel for rotation therewith, the outer surface of said capstan shaft means engaging the pressure roller of a cartridge inserted into the player for driving the recording tape therebetween, bearing surface means provided within said hollow shaft means and a support shaft having a diameter less than the inner diameter of said hollow shaft means for insertion therein, said support shaft mounted on said housing wall and being received by said hollow shaft means in engagement with said bearing surface means to provide relatively free rotation of said hollow shaft means and said flywheel with respect to said support shaft.

7. A cartridge type tape player as claimed in claim 6 further including support shaft holder means mounted on the base wall of said housing, said support shaft being mounted fixedly on said holder means and extending outwardly therefrom, said holder means including a bearing surface surrounding said support shaft and wherein the opposite end of said capstan shaft engages said bearing surface and is rotatable thereon.

8. A cartridge type tape player as claimed in claim 6 wherein said bearing surface means includes a bearing ball mounted on the end of said support shaft for engagement with an inner surface of said hollow capstan shaft means, said bearing ball supporting said joined flywheel and capstan shaft for rotation thereon.

* * * * *